United States Patent [19]

Hargest

[11] Patent Number: 5,506,564
[45] Date of Patent: Apr. 9, 1996

[54] MARINE CRAFT FUEL ALERT SYSTEM

[76] Inventor: Thomas S. Hargest, 14 Lockwood Blvd. Apt. 10J, Charlestown, S.C. 29401

[21] Appl. No.: 189,941

[22] Filed: Feb. 1, 1994

[51] Int. Cl.$^6$ .................................................. B60Q 1/00
[52] U.S. Cl. .................. 340/450.2; 340/450; 340/612; 340/616; 340/618; 73/307; 73/308; 137/386; 137/551; 137/558; 200/190
[58] Field of Search ........................ 340/450.2, 450, 340/612, 616, 618, 623, 309.15; 73/290 R, 307, 313, 308, 321; 137/558, 424, 551, 552.7, 624.11, 386; 200/84 R, 61.04, 190, 186, 150 R, 150 J; 116/227, 228

[56] References Cited

U.S. PATENT DOCUMENTS

| | | | |
|---|---|---|---|
| 258,872 | 6/1882 | Ashcroft | 340/624 |
| 912,970 | 2/1909 | Marsh . | |
| 973,772 | 10/1910 | Gedeoin | 340/624 |
| 1,049,952 | 1/1913 | Walton | 340/612 |
| 1,348,015 | 7/1920 | Lee . | |
| 1,796,586 | 3/1931 | Bradshaw | 340/623 |
| 2,756,410 | 7/1956 | Tobias | 340/625 |
| 3,185,789 | 5/1965 | Gunther | 340/624 |
| 3,204,230 | 8/1965 | Hosford, Jr. | 340/624 |
| 3,335,414 | 8/1967 | Meserow | 340/625 |
| 3,680,044 | 7/1972 | Tsubouchi . | |
| 3,811,051 | 5/1974 | Merrell | 340/624 |
| 3,849,771 | 11/1974 | Applin . | |
| 4,102,191 | 7/1978 | Harris | 340/625 |
| 4,149,412 | 4/1979 | Fish | 340/612 |
| 4,341,178 | 7/1982 | Price | 340/618 |
| 4,418,712 | 12/1983 | Braley | 340/624 |
| 4,799,047 | 1/1989 | Saitoh | 340/450.2 |
| 4,963,169 | 10/1990 | Granville | 220/85 UR |
| 4,967,181 | 10/1990 | Iizuka et al. | 340/450.2 |
| 5,023,608 | 6/1991 | Delisle, Jr. et al. | 340/450.2 |
| 5,028,910 | 7/1991 | Meacham et al. | 340/616 |
| 5,065,139 | 11/1991 | Shefsky | 340/618 |
| 5,181,022 | 1/1993 | Schupp | 340/612 |
| 5,229,766 | 7/1993 | Hargest | 340/984 |

OTHER PUBLICATIONS

Advertisement, for "Rainbow Catcher mEPA", by Trident Ventures, Inc. 1 page Feb. 1, 1994.

*Primary Examiner*—Donnie L. Crosland
*Attorney, Agent, or Firm*—Richard M. Moose

[57] ABSTRACT

A marine craft fuel alert system is operative during a given time period, to compare actual fuel capacity measurements with selected fuel tank capacity reference values, to permit timely intervention. Used with a relatively high reference value and operative during fuel loading, the system and methodology gives a warning to a fuel input agent (i.e., person controlling fuel loading) in sufficient time for the agent to terminate fuel loading and prevent environmental pollution by fuel overfill spillage. Conversely, the system and methodology, with appropriate modifications, can be used to sense and warn of predetermined low fuel level conditions. The system can be integrally incorporated into an original equipment marine craft system or retrofit thereto. Electrical interconnections may extend to marine craft ignition system interdiction during operation of the fuel loading monitoring and warning.

19 Claims, 3 Drawing Sheets

MARINE CRAFT FUEL ALERT SYSTEM

BACKGROUND OF THE INVENTION

The present invention relates generally to system and methodology for fuel monitoring, which may be adapted to form a pollution control apparatus and particularly to form an apparatus that prevents undesirable fuel spills from a fuel tank, in particular a marine craft fuel tank.

Boaters have significant problems in fueling their boats due to fuel spills. In boats with integrated tanks, spills typically occur through a safety vent line. However, ejection of fuel into any river, lake, bay, inlet, or harbor is harmful to the environment and potentially immediately dangerous to boaters (from fire, explosion, or contact burns). In addition, such discharges (intentional or accidental) are against federal law and can result in a fine of up to several thousand dollars. When it is considered that there are literally hundreds of thousands, if not millions, of boats in the United States with integrated tanks, many with three or four such tanks each, and that such may be fueled as often as weekly, it can be reasonably estimated that possibly even millions of gallons of fuel are unintentionally and/or unavoidably discharged into the waterways each year.

Approaches for preventing this problem are disclosed in my U.S. Pat. No. 5,229,766 for Marine Fuel Tank Pollution Control Apparatus and are incorporated herein by reference thereto. In general, such approaches include mechanical means for either blocking fuel flow through the vent line or capturing the overflow.

Additionally, devices are known which have the purpose of attempting to detect various overflow conditions, though not all in a marine safety environment. For example, U.S. Pat. No. 5,028,910 to Meacham discloses a drain overflow alarm for a washing machine drain which includes means to disconnect the power supply to the washing machine and to notify the operator. Similarly, U.S. Pat. No. 4,418,712 to Braley discloses an overflow control system for use with home appliances which detects liquid level in a stand pipe and shuts power off whenever such level reaches a predetermined limit. U.S. Pat. No. 3,811,051 to Merrell discloses a capacitance responsive detector system which issues a warning when the liquid level in a tank is too low.

By way of further background generally, other devices are known for variously indicating or detecting fluid level. U.S. Pat. No. 4,967,181 to Iizuka discloses a fuel level gauge provided with an apparatus for issuing a warning on the amount of remaining fuel for use in particular with automobile fuel tanks. U.S. Pat. No. 4,149,412 to Fish discloses a level measuring apparatus that includes a timer responsive to changes in capacitance of a probe due to changes in the level of material in a container.

U.S. Pat. No. 4,102,191 to Harris discloses a digital fuel gauge for monitoring the liquid level in a fuel storage tank. U.S. Pat. No. 3,335,414 to Meserow discloses a critical condition warning device to indicate or signal a low fuel level in the fuel supply of an internal combustion vehicle.

U.S. Pat. No. 2,756,410 to Tobias discloses a liquid level warning device for indicating the volume of liquid contained within a tank located at a point remote from the device. U.S. Pat. No. 1,796,586 to Bradshaw discloses an electric indicating means for indicating the quantity of liquid in a tank. U.S. Pat. No. 1,049,952 to Walton discloses a water level indicating system for indicating the varying levels in the water ballast tanks of the bilge of steamships.

Still further systems are shown by other exemplary U.S. patents, as follows.

| U.S. Pat. No. | INVENTOR | ISSUED | TITLE |
| --- | --- | --- | --- |
| 3,680,044 | TSUBOUCHI | 7/72 | LIQUID LEVEL INDICATING ARRANGEMENT FOR VEHICLES |
| 3,204,230 | HOSFORD, JR. | 8/65 | FLUID LEVEL INDICATOR |
| 4,963,169 | GRANVILLE | 10/90 | FUEL TANK VENTING SEPARATOR |
| 258,872 | ASHCROFT | 6/1882 | WATER AND STEAM SEPARATOR |
| 3,849,771 | APPLIN | 11/74 | LIQUID LEVEL ALARM |
| 912,970 | MARSH | 2/09 | ELECTRIC ALARM WATER GAGE |
| 973,772 | GEDEON | 10/10 | VESSEL LOADING ALARM |
| 1,348,015 | LEE | 7/20 | LEAK DETECTOR FOR VESSELS |
| 3,185,789 | GUNTHER | 5/65 | FLUID OVERFLOW SWITCH APPARATUS |

The complete disclosures of all the above-indicated patents are fully incorporated herein by reference.

SUMMARY OF THE INVENTION

One primary object of the invention is to provide a fuel overfill detector device particularly useful and effective for combating marine pollution.

A further object of the present invention is to eliminate fuel tank spillage caused by fuel tank overflow.

Another principal object of the present invention is to provide means that issues a warning when fuel has reached a predetermined level in the fuel tank during filling, to permit timely intervention and to avoid heretofore unavoidable and unintentional fuel spills.

It is yet another principal object of the present invention to provide a fuel overfill detector device such that the fuel fill level at which a warning is issued may be determined and adjusted by the operator, for insuring an effective intervention arrangement adapted to particular circumstances.

It is still another object of the present invention to provide a fuel overfill detector capable of retrofit into an existing fuel level detection system, to facilitate widespread use of the invention for effective prevention of currently major marine pollution.

A further principal object of the present invention is to provide a device for protecting the environment from pollution by warning an operator before a possible discharge of fuel from a fuel tank vent.

It is a still further object of the present invention to provide a fuel overfill detector device that operates regardless of whether the marine craft is in operation and which automatically deactivates after a predetermined period of time, long enough to complete tank filling, to prevent battery run-down.

Another present object is to permit use of the present devices and methodology, with slight adjustments and/or variations, to equally and advantageously provide for low fuel level monitoring and warning operations.

Additional objects and advantages of the invention will be apparent to those of ordinary skill in the art from the description which follows, or may be perceived by practice of the invention disclosed herewith.

Additionally, it should be further appreciated that modifications and variations to the specifically illustrated and discussed features and methodology, construction, and materials hereof may be practiced in various embodiments and uses of this invention without departing from the spirit and scope thereof, by virtue of present reference thereto. Such variations may include, but are not limited to, substitution of equivalent means, steps and features or materials for those shown or discussed, and the functional or positional reversal of various parts, features, steps, or the like.

Still further, it is to be understood that different embodiments of this invention may include various combinations or configurations of presently disclosed features, elements, or steps, or their equivalents (including combinations or configurations thereof not expressly shown in the figures or stated in the detailed description).

One present exemplary embodiment relates to a fuel overfill detector device, such as capable of retrofit into the fuel level detection system of a conventional marine craft. Such a marine craft typically includes at least one fuel tank for storing liquid fuel to be consumed by an internal combustion engine. The marine craft may include a boat having a hull that supports an internal combustion engine for propelling the boat through the water. The boat will typically include a marine battery or another electric power source for operation of the engine and other adjunct electrical devices (e.g., a marine radio, running lights, and/or electric horn).

In one presently preferred embodiment of the present invention, a present fuel overfill detector may be electrically connected to and between the ignition switch and the fuel gauge of a conventional fuel level detection system on a marine craft. In particular, such preferred embodiment may employ an electric relay so that, upon activation of the fuel overfill detector, power is supplied both to the fuel overfill detector and the existing fuel level detection system regardless of the position of the ignition switch. As explained below in greater detail, such preferred embodiment may use a signal from the marine craft's existing fuel gauge to indicate the present level of fuel in the craft's tank. The relay, in effect, provides a by-pass of the ignition switch to the existing fuel gauge to allow delivery of the signal when the marine craft is not in operation.

In the above-referenced presently preferred exemplary embodiment, upon activation of the start switch, a twelve volt (for example) source is connected to a timing circuit which supplies twelve volts to downstream circuitry for a predetermined period (for example, 15 minutes) long enough to allow filling of the tank. The timing circuit thus allows for operation of such presently preferred embodiment without depleting the marine craft power source (e.g., battery).

As described above, activation of such presently preferred embodiment activates both an existing fuel gauge and circuitry downstream from said fuel gauge. Such downstream circuitry may be comprised generally of a level detection means and a warning means. More particularly, the present level detection means may preferably be comprised of comparator circuitry which compares a signal from the existing fuel gauge with a predetermined voltage level (reference level) equivalent to the signal that would be received from the existing fuel gauge if the fuel in the tank were to reach a predetermined or selectable desired level. When the comparator circuitry receives an indication that the level of fuel in the tank has exceeded the reference level (or dropped below the reference level, depending on the orientation of the comparator circuitry) it supplies an appropriate signal for activating the warning means.

In such presently preferred embodiment, the present warning means may preferably be comprised of an audible alarm (for example, such as a buzzer) in combination with input circuitry functioning as a pulse stretcher to activate the alarm for a selected period long enough to allow operator detection. Those of ordinary skill in the art will recognize that other warning devices may be employed, for example, a light.

Thus, for example, by adjusting the reference level to a level corresponding to a ninety percent full tank, the warning device will activate when the fuel in the tank actually reaches that level, allowing the operator to cease or slow the tank's filling to avoid spillage through the vent lines.

It is to be understood that present embodiments likewise encompass corresponding methods and associated steps for practicing same.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended figures, in which.

Figure 1:
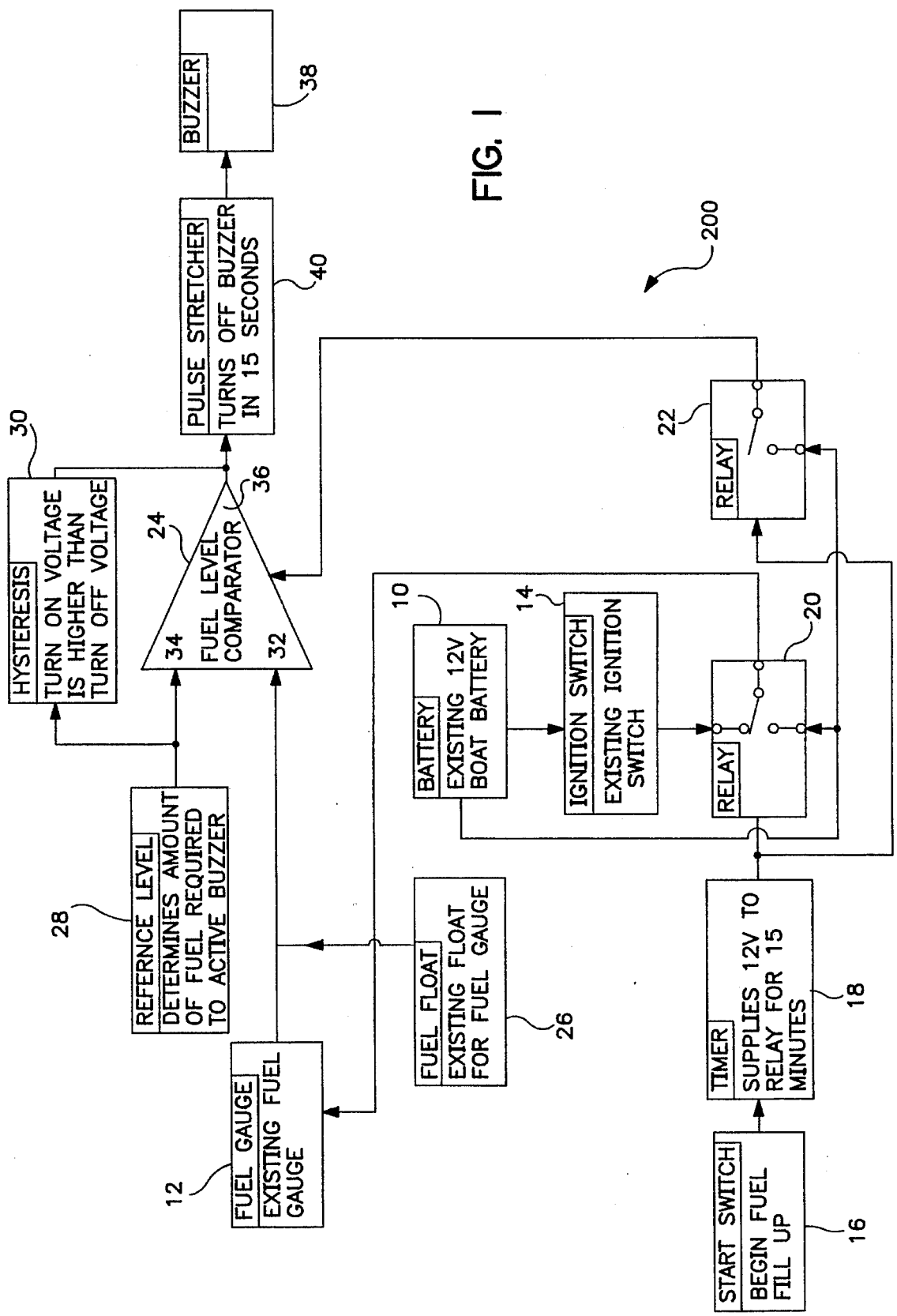
FIG. 1 is an exemplary block diagram illustrating certain aspects as discussed herein of the apparatus and method of the present invention.

Repeat use of reference characters in the following specification and appended drawings is intended to represent the same or analogous features, elements, or steps of the present invention.

DETAILED DESCRIPTION OF THE PREFERRED EMBODIMENTS

Reference will now be made in detail to one presently preferred embodiment of the invention, an example of which is illustrated in the accompanying drawings. Such example is provided by way of explanation of the invention, not limitation of the invention. In fact, it will be apparent to those skilled in the art that various modifications and variations can be made in the present invention without departing from the scope or spirit of the invention. Thus, it is intended that the present invention cover such modifications and variations that come within the scope of the appended claims and their equivalents.

As referenced above, certain main aspects of the present invention are concerned with preventing fuel spillage through vent lines during filling of marine craft fuel tanks (i.e., during fuel loading operations). Conventional fuel level detecting systems fail to provide the operator with a warning when the tank is near full. Consequently, fuel spills often occur (such as through an unobserved or unobservable vent line) before the operator can cease or slow filling. It is possible, however, in accordance with the subject invention to provide an adquate warning by comparing a signal from the marine craft existing fuel gauge, for example, with a predetermined voltage level corresponding to a near-full (or other predetermined) tank condition.

Accordingly, one preferred embodiment of the present invention is represented generally in FIG. 1. Whenever present exemplary fuel overfill detector 200 is not activated, marine craft battery 10 powers existing fuel gauge 12 through operation of an existing ignition switch Upon actuation of a start switch 16, however, in accordance with the invention, timer 18 begins to clock, triggering switching means or relay 20 so as to supply power from battery 10 to fuel gauge 12. Thus, fuel gauge 12 operates during the predetermined (and selectable) clock period of timer 18 regardless of the position of marine craft ignition switch 14. At the end of such timing cycle (i.e., the clock period of timer 18), relay 20 returns to its original position, which results in protecting battery 10 from a run-down condition.

When fuel overfill detector 200 is activated by tripping start switch 16, another relay or switching means 22 is triggered for the duration of the cycle time of timer 18, for providing power to fuel level comparator 24. Fuel level comparator 24 compares the voltage supplied by an existing fuel float device 26, reflecting a current fuel level in an external fuel tank (not shown) of the marine craft, with the predetermined reference voltage supplied in accordance with the subject invention by reference level indicator 28. Hysteresis is added to fuel level comparator 24 with illustrated exemplary element 30, so that slight fluctuations in voltage coming from fuel float device 26 will not turn off fuel level comparator 24 once it is turned on. In other words, the turn on voltage for fuel level comparator 24 will be maintained so as to always be higher than the turn off voltage. When the voltage from fuel float device 26 at comparator input 32 drops below the predetermined reference voltage at comparator input 34, the fuel level comparator 24 output 36 goes high, activating a warning means or buzzer 38 for a time determined by pulse stretcher 40.

Therefore, by adjusting the voltage of reference level indicator 28 to be, for example, ninety percent of the voltage that would appear from fuel float device 26 if the external fuel tank were full, buzzer 38 will sound whenever the external fuel tank is ninety percent full.

Figure 2:
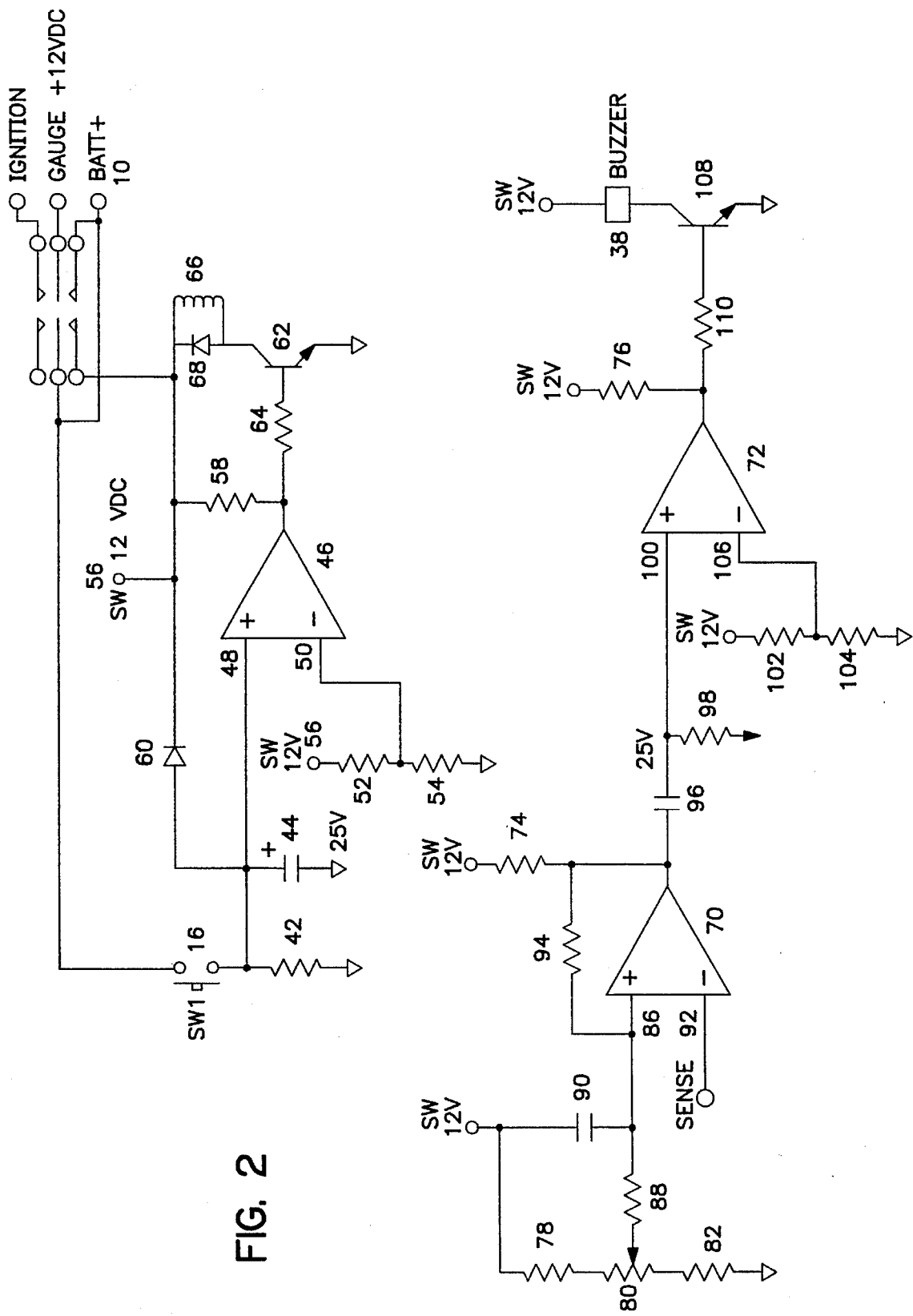
FIG. 2 is a schematic representation of exemplary electric circuitry representing and relating to one presently preferred embodiment of the method and system according to the present invention.

Referring now to FIG. 2, an exemplary present circuit diagram substantially depicts an implementation of one preferred embodiment of the present invention such as shown in FIG. 1. When start switch 16 is closed, twelve volts is supplied from battery 10 to the resistor/capacitor network comprised of resistor 42 and capacitor 44, thereby charging capacitor 44. The voltage of charged capacitor 44 is applied to comparator 46 at its positive input 48.

Initially, the voltage at input 48 will exceed the voltage at negative input 50, supplied by a voltage divider network comprised of resistors 52 and 54 and a twelve volt power source at 56 (not shown, but such power source may comprise battery 10 or some other external source). At this point, the output of comparator 46 goes high, triggering transistor 62 via resistor 64 and causing relay 66 to activate. It will be understood by those of ordinary skill in the art that diode 68 is provided for the protection of transistor 62. Comparator 46 requires the operation of pull-up resistor 58, diode 60 and twelve volt external power source 56 for proper operation, as understood by those of ordinary skill in the art.

As capacitor 44 discharges, the voltage applied to comparator 46 decreases at its input 48. When such voltage drops below the relatively constant voltage applied at input 50, comparator 46 will go low, thereby deactivating transistor 62 and, consequently, relay 66. Thus, operation of the resistor/capacitor network comprised of resistor 42 and capacitor 44 functions as a timing device or means for controlling the period during which relay 66 and, as described below, associated downstream circuitry are activated. It will be understood, without further discussion, that such time period may be selected by variations, such as in the values of components 42 and 44. Likewise, apparatus may be provided, if desired, to enable the user to select on-site various time periods.

As shown in FIG. 2, relay 66 provides twelve volts to comparators (or switching means) 70 and 72, via pull-up resistors 74 and 76, respectively, to a voltage divider network comprised of resistors 78, 80, and 82, and to buzzer 38. Such resistor network determines the voltage applied to comparator 70 at its positive input 86. In particular, resistor 80 is a variable resistor which may be manually adjusted such that a voltage equal to, for example, ninety percent of the full-level voltage associated with an external fuel tank (not shown) may be applied to comparator 70 at 86. Resistor 42 may also be provided as a variable resistor, if desired, for ease of making time period adjustments. A resistor/comparator network comprised of resistor 88 and capacitor 90 dampens the potentially adverse effects of peaks and dips in the fuel tank.

A voltage corresponding to the existing fuel level in the external tank is applied to comparator 70 at its negative input 92. Typically, such voltage may be produced by an existing fuel float device, such as represented in FIG. 1. Additionally, resistor 94 adds hysteresis so that the turn on level of comparator 70 is higher than the turn off level.

Capacitor 96 and resistor 98 collectively comprise a resistor/capacitor network that functions in relation to the circuitry elements as a pulse stretcher. When comparator 70 goes high, capacitor 96 is charged. As capacitor 96 subsequently discharges through resistor 98, a prolonged and decreasing voltage is applied to comparator 72 at its positive input 100. A voltage determined by a voltage divider network comprised of resistors 102 and 104 is applied to comparator 72 at its negative input 106. The output of comparator 72 is high as long as the voltage at positive input 100 exceeds that applied to negative input 106.

While the output of comparator 72 is high, transistor 108 is activated via resistor 110. Such operation allows current to flow through, and thus activate, buzzer 38.

Typically, the voltage output from a fuel level-detection float device will be at a maximum whenever the fuel level is lowest and, conversely, at a minimum whenever the fuel level is highest. Thus, as the tank is filled, the voltage seen by comparator 70 decreases at its negative input 92. As the fuel level increases beyond the point corresponding to the voltage level determined by the voltage divider network comprised of resistors 78, 80, and 82, the voltage applied to comparator 70 at its negative input 92 falls below the voltage applied at its positive input 86, causing comparator 70 to go high. Such operation causes comparator 72 to go high for a period determined by the resistor/capacitor network comprised of resistor 98 and capacitor 96 as described above, thus activating buzzer 38 for the same period of time as described above.

In operation, fuel overfill detector 200 is activated upon closing of switch 16 for a period of time determined by resistor 42 and capacitor 44. As an operator fills an external fuel tank, the voltage applied to comparator 70 at its negative input 92 falls, eventually falling below the predetermined voltage level applied at the positive input 86. Such operation causes comparator 70 to activate buzzer 38 via comparator 72 and transistor 108 for a time period determined by resistor 98 and capacitor 96.

Figure 3:
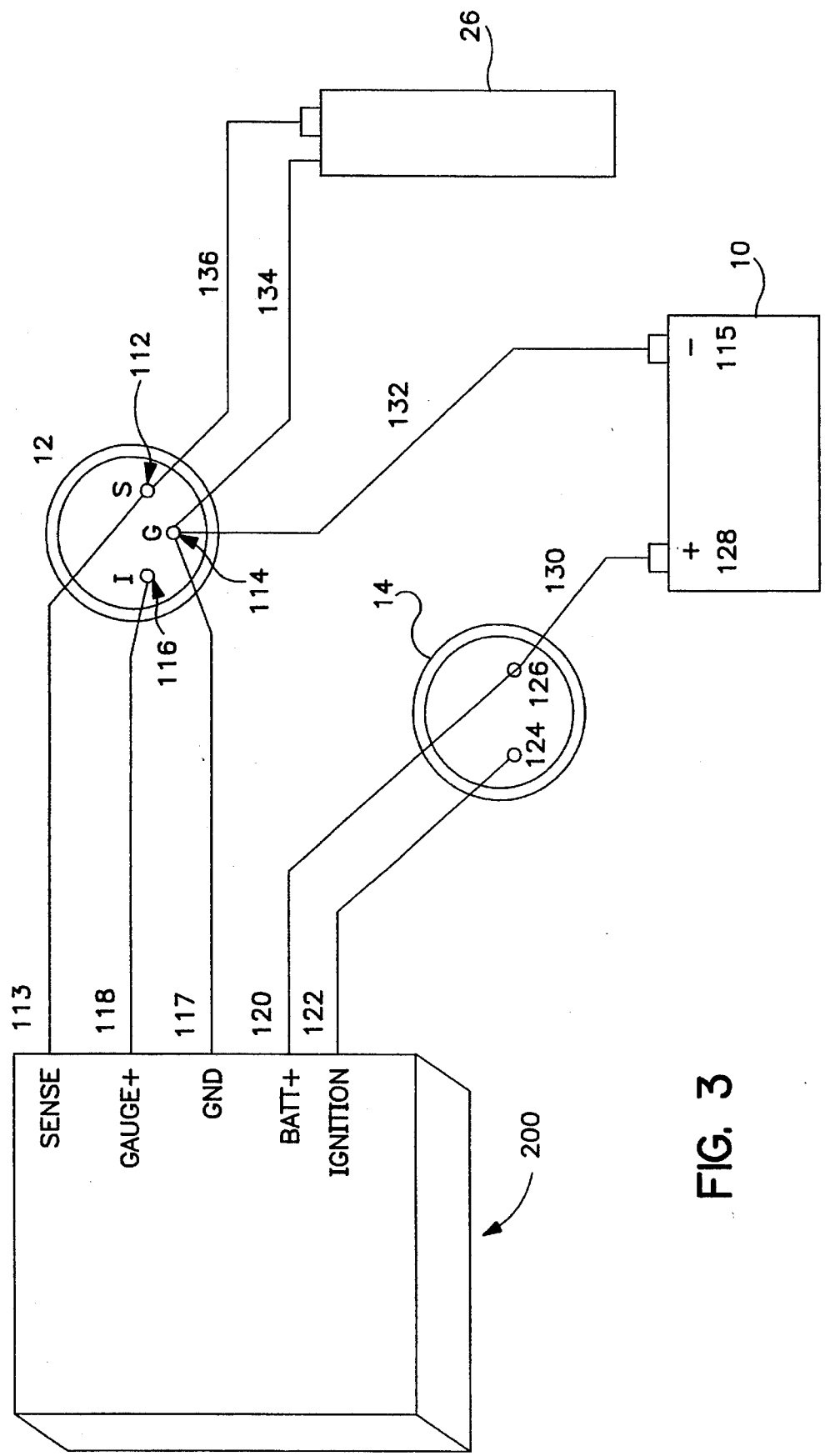
FIG. 3 is an exemplary diagrammatical representation of the present invention, in association with an existing fuel level detection system.

Referring now to FIG. 3, one preferred embodiment of a present fuel overfill detector 200 is diagrammatically shown, for example, as integrated into a typical fuel level detection system, such as for a marine craft. Certain embodiments of the present invention may also be provided as a retrofit to existing marine craft fuel detection systems, for enhanced operation thereof in accordance with present devices and methodology.

In the embodiment shown, the output of fuel level sensor 26 is electrically connected to fuel gauge 12 and to present fuel overfill detector 200 at points 112 and 113, respectively. Fuel overfill detector 200, fuel gauge 12, and fuel level sensor 26 are all grounded via battery 10 at points 114, 115 and 117. A twelve volt voltage level is communicated from fuel gauge 12 at point 116 to fuel overfill detector 200 at point 118. Finally, fuel overfill detector 200 is electrically connected at points 120 and 122 to ignition switch 14 at points 124 and 126, and thereby to battery 10 at point 128. Existing wiring is presently represented in FIG. 3 by lines 130, 132, 134, and 136.

While a particular embodiment of the invention has been described and shown, it will be understood by those of ordinary skill in the art that the present invention is not limited thereto, since many modifications may be made. For example, more extensive use of digital circuitry might result in different configurations without departing from the scope and spirit of the present invention, or from the present methodology. Similarly, the circuitry as described above may be used to issue a warning whenever the fuel level in a marine craft's tank has reached either a desired minimum or maximum. In particular, for example, if the inputs to fuel level comparator 24 were to be reversed, fuel level comparator 24 would go high, thereby activating buzzer 38, whenever the voltage from fuel float device 26 at input 34 exceeded the predetermined voltage at input 32. In other words, whenever the fuel level measured by fuel float device 26 dropped below the predetermined level represented by the predetermined voltage at input 32, buzzer 38 would be activated.

It will also be understood that the present invention could readily be configured for use in conjunction with fluid level detection systems other than those specifically of marine craft, and is especially useful in any fueling system having potential spillways, such as unobservable vent lines or the like. Additionally, the present invention could be alternately incorporated into an existing fuel level detection system or employed as a retrofit. Therefore, it is contemplated and intended to cover any and all such embodiments (of both apparatus and methodology) as may fall within the scope of the invention as defined by the appended claims.

What is claimed:

1. An anti-overflow fuel alert system for use with a fuel tank system having a fuel tank and a power source, comprising:

a detecting device operatively connected to the fuel tank system to directly detect an actual level of fuel within said fuel tank and generate an actual fuel level signal corresponding thereto;

a control device operatively in communication with said detecting device to receive said actual fuel level signal and connected to the power source, said control device controlling the operating period of said anti-overflow fuel alert system and controlling power flow from the power source to said anti-overflow fuel alert system;

an adjustable reference fuel level input device configured with said control device for inputting an adjustable desired fuel level reference signal to said control device, said adjustable fuel level reference signal corresponding to a fuel level within a detecting range of said detecting device, said control device comparing said desired fuel level reference signal to said actual fuel level signal from said detecting device; and a warning device operatively connected to said control device, said warning device issuing a warning, responsively to said control device, whenever said actual fuel level exceeds said desired fuel level reference during said operating period.

2. An anti-overflow fuel alert system as in claim 1, wherein said control device is comprised of:

a timing mechanism initiated by the fuel input agent for conducting a timing period thereof; and a switching mechanism, triggered during said timing period of said timing mechanism, for connecting the power source to said detecting device.

3. An anti-overflow fuel alert system as in claim 1 wherein:

said control device includes a timing mechanism initiated by a fuel input agent, said timing mechanism conducting a timing period thereof, and a switching mechanism, connected to said timing mechanism and triggered during said timing period, said timing mechanism connecting the power source to predetermined other elements of the anti-overflow fuel alert system;

wherein said detecting device includes a reference mechanism, said reference mechanism establishing an adjustable reference level, selected by the fuel-input agent, corresponding to a predetermined fuel level in the fuel tank; and a comparing mechanism operatively connected to said reference mechanism, said comparing mechanism comparing said reference level with the actual fuel level in the fuel tank and detecting whenever the fuel level exceeds the reference level.

4. An anti-overflow fuel alert system as in claim 3, wherein said comparing mechanism is electrically connected with an existing fuel gauge arrangement of a marine craft so as to receive an output voltage level corresponding to the actual fuel level in the fuel tank from such fuel gauge arrangement.

5. An anti-overflow fuel alert system as in claim 1, wherein said detecting range is within about eighty percent to about one hundred percent of the capacity of the fuel tank.

6. An anti-overflow fuel alert system capable of retrofit into an existing fuel detection system of the type having an existing power source, an existing fuel gauge, and a separately existing ignition device, comprising:

control means for controlling an operating period of said anti-overflow fuel alert system and for controlling power flow from an external power source to said anti-overflow fuel alert system, said control means including timing means initiated by a fuel input agent for conducting a timing period thereof; first switching means, triggered during said timing period of said timing means, for connecting when triggered an existing power source to an existing fuel gauge independently of an existing ignition device; and second switching means, triggered during said timing period of said timing means, for connecting when triggered an existing power source to predetermined other elements of said anti-overflow fuel alert system downstream from said relay;

detecting means for detecting whenever an external fuel tank level exceeds a predetermined level, said detecting means being comprised of reference means for establishing a selectable reference level, selected by the fuel-input agent, corresponding to a predetermined fuel level in an external fuel tank; and comparing means for comparing said reference level with the actual fuel level in such external tank, as determined by an existing fuel level detection device, and detecting whenever the actual fuel level exceeds said reference level; and warning means, responsive to said control means and said detecting means, for issuing a warning whenever said detecting means indicates that said fuel level in the external fuel tank has exceeded said reference level.

7. An anti-overflow fuel alert system capable of retrofit into an existing fuel gauge arrangement using an existing fuel tank float device that generates an output voltage level in correspondence with the amount of fuel in the fuel tank, comprising:

a comparator circuit generating an output signal whenever the output voltage level exceeds an adjustable reference voltage corresponding to a predetermined fuel level of the fuel tank;

an adjustable reference fuel level input device configured with said comparator circuit for inputting the adjustable reference voltage to said comparator circuit;

a warning device operatively connected to said comparator circuit, said warning device issuing a warning, responsively to said output signal from said comparator circuit; and a control circuit operatively in communication with said detecting device and triggered by a fuel input agent for controlling the power flow, for a predetermined time period, from an external power source to said comparator circuit and to the existing fuel gauge arrangement independently of existing ignition devices.

8. An anti-overflow full alert system as in claim 7, wherein said control circuit comprises:

a timing mechanism triggered by the fuel input agent and generating an output signal during said predetermined time period;

a first switching mechanism, triggered by said output signal from said timing mechanism, for controlling the power flow, for said predetermined time period, from the external power source to the existing fuel gauge arrangement independently of existing ignition devices; and a second switching mechanism, triggered by said output signal from said timing mechanism, for controlling the power flow, for said predetermined time period, from the external power source to said comparator circuit independently of existing ignition devices.

9. An anti-overflow fuel alert system as in claim 8, wherein said control circuit is further operative for controlling the power flow from the external power source to said warning device.

10. An anti-overflow fuel alert system as in claim 8, wherein said first switching mechanism is electrically connected between an existing ignition device of a marine craft and an existing fuel gauge arrangement of such marine craft.

11. An anti-overflow fuel alert system capable of retrofit into an existing fuel gauge arrangement using a fuel tank float device that generates an output voltage level, said system comprising:

reference means for generating a reference voltage corresponding to a predetermined percentage of the capacity of a fuel tank and capable of adjustment by a fuel input agent;

comparing means for comparing said reference voltage with the output voltage level and generating an output signal whenever such output voltage level exceeds said reference voltage;

warning means for issuing a warning upon receiving said output signal from said comparing means;

timing means, actuatable by the fuel input agent for generating an output signal for a predetermined time period;

first switching means, actuated by said output signal from said timing means, for controlling the power flow from the external power source to the existing fuel gauge arrangement independently of existing ignition devices, for said predetermined time period; and second switching means, actuated by said output signal from said timing means, for controlling the power flow from the external power source to said comparator circuit independently of existing ignition devices, for said predetermined time period.

12. An anti-overflow fuel alert system of claim 11, wherein said second switching means is operative for controlling power flow from the external power source to said warning means.

13. An anti-overflow fuel alert system as in claim 11, wherein said predetermined percentage of the capacity of the fuel tank is generally within a range of from about eighty percent to about one hundred percent.

14. An anti-overflow fuel alert system as in claim 11, wherein said first switching means is electrically connected between an existing ignition device of a marine craft and the existing fuel gauge arrangement thereof, and wherein said comparing means is electrically connected with the existing fuel gauge arrangement of such marine craft so as to receive the output voltage level from such fuel gauge arrangement.

15. A marine craft anti-overflow fuel alert system, comprising:

a power source;

a fuel gauge arrangement comprised of a fuel gauge and a fuel level detecting device generating a signal to said fuel gauge corresponding to the fuel level in a fuel tank of such marine craft;

a comparator circuit generating an output signal whenever said signal from said fuel gauge arrangement exceeds an adjustable reference voltage corresponding to a predetermined fuel level of such fuel tank;

an adjustable reference fuel level input device configured with said comparator circuit for inputting the adjustable reference voltage to said comparator circuit;

a warning device activated by said output signal from said comparator circuit, for issuing a warning;

an ignition device, for an engine of the marine craft, electrically connected between said power source and said fuel gauge arrangement; and a control circuit, triggered by a fuel input agent, for controlling, for a predetermined time period, the power flow from said power source to said comparator circuit and to said fuel gauge arrangement independently of said ignition device, for safe fueling of the marine craft fuel tank without operation of said ignition device.

16. A marine craft anti-overflow fuel alert system as in claim 15, wherein said control circuit is comprised of:

a timing mechanism, actuatable by said fuel input agent, for generating an output signal during said predetermined time period;

a first switching mechanism, triggered by said output signal from said timing mechanism, for controlling the power flow, for said predetermined time period, from said power source to said fuel gauge arrangement independently of said ignition device; and a second switching mechanism, triggered by said output signal from said timing mechanism, for controlling the power flow, for said predetermined time period, from said power source to said comparator circuit independently of said ignition device.

17. A marine craft anti-overflow fuel alert system as in claim 16, wherein said control circuit is operative for controlling the power flow from said power source to said warning means.

18. A marine craft anti-overflow fuel alert system, comprising:

a power source;

a fuel gauge arrangement comprised of a fuel gauge and a fuel level detecting device generating a signal to said fuel gauge corresponding to the fuel level in a fuel tank of such marine craft;

reference means for generating a reference voltage corresponding to a predetermined percentage of the capacity of such fuel tank and capable of adjustment by a fuel input agent;

comparing means for comparing said reference voltage with said signal from said fuel level detecting means and for generating an output signal whenever said signal exceeds said reference voltage;

warning means activated by said output signal from said comparing means, for issuing a warning;

an ignition device, for an engine of the marine craft, electrically connected between said power source and said fuel gauge arrangement;

timing means, actuatable by the fuel input agent, for generating an output signal for a predetermined time period;

first switching means, triggered by said output signal from said timing means, for controlling the power flow, for said predetermined time period, from said power source to said fuel gauge arrangement independently of said ignition device; and second switching means, triggered by said output signal from said timing means, for controlling the power flow, for said predetermined time period, from said power source to said comparing means and said reference means independently of said ignition device.

19. A marine craft anti-overflow fuel alert system as in claim 18, wherein said second switching means is operative for controlling the power flow from said power source to said warning means.

* * * * *